July 14, 1925.
L. F. BURNHAM ET AL
1,545,735
TROLLEY BASE
Filed May 24, 1921  2 Sheets-Sheet 2
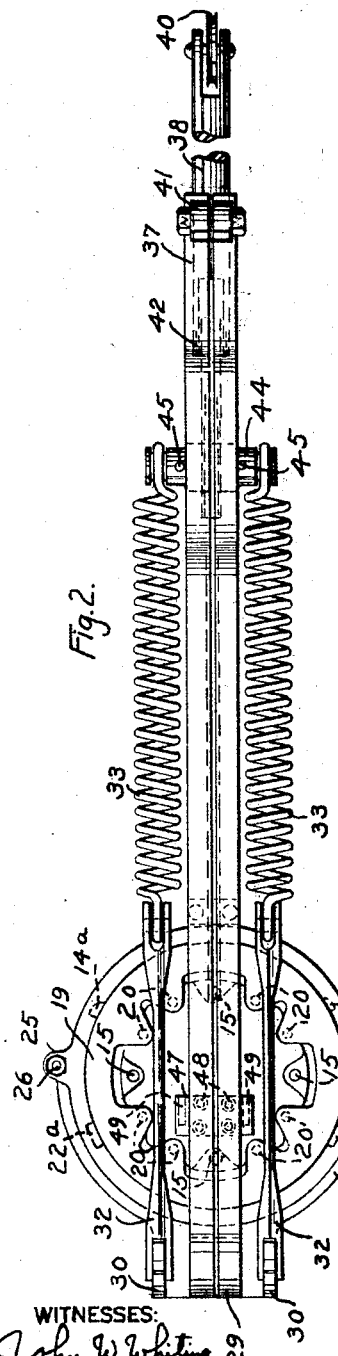
WITNESSES:
John W. Whiting
A. Martin
INVENTORS.
Leland F. Burnham &
Frank C. Felix.
BY
Wesley G. Carr
ATTORNEY Patented July 14, 1925.

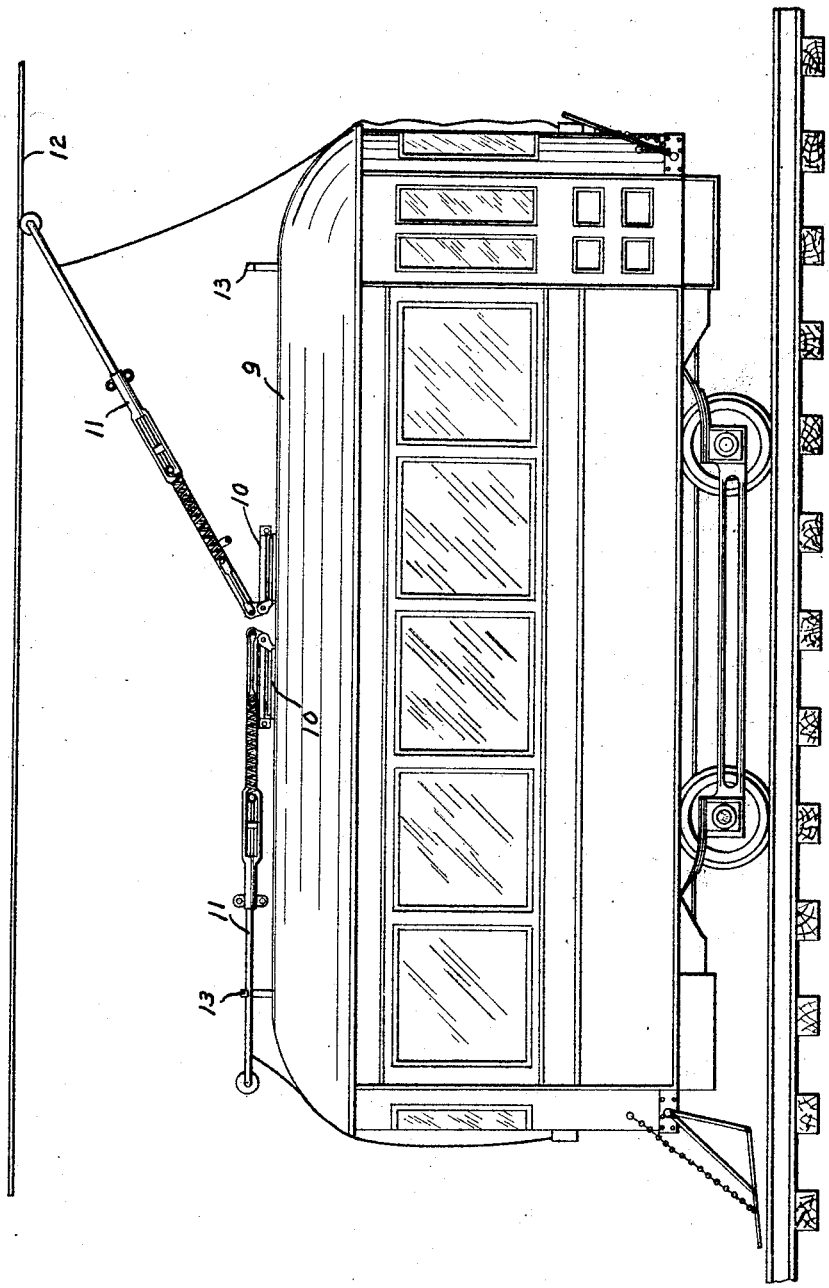

1,545,735

UNITED STATES PATENT OFFICE.

LELAND F. BURNHAM, OF FAIRPORT, NEW YORK, AND FRANK C. FELIX, OF AMBRIDGE, PENNSYLVANIA, ASSIGNORS TO R. D. NUTTALL COMPANY, A CORPORATION OF PENNSYLVANIA.

TROLLEY BASE.

Application filed May 24, 1921. Serial No. 472,057.

*To all whom it may concern:*

Be it known that we, LELAND F. BURNHAM, a citizen of the United States, and a resident of Fairport, in the county of Monroe and State of New York, and FRANK C. FELIX, a citizen of the United States, and a resident of Ambridge, in the county of Beaver and State of Pennsylvania, have invented a new and useful Improvement in Trolley Bases, of which the following is a specification.

Our invention relates to trolley bases and particularly to means whereby trolley poles are supported for movement in both vertical and horizontal planes and to means for maintaining the poles under tension.

One object of our invention is to provide a base extending a minimum distance above the roof of a car and which is adapted to pivotally support the trolley pole from a point approximately at the center of the car roof, whether there be one or two bases mounted upon the car.

Another object of our invention is to provide a base that is adapted to support the trolley pole in such manner that the maximum range of movement is obtainable between the roof of the car and a trolley wire without employing a pole of comparatively great length and without the necessity of mounting the base on a platform or other superstructure, and particularly to provide a device of the form wherein two bases may be employed for a single car without sacrificing any of the advantages herein enumerated.

A further object of our invention is to provide means whereby the pole is maintained under substantially constant pressure against the trolley wire, regardless of variations in distance between the roof of the car and the wire, and to provide means for cushioning the pole against shocks when the trolley wheel accidentally leaves the wire.

Still another object of our invention is the provision of a trolley base possessing the advantages of accessibility and interchangeability and comprising means for retaining lubricating material in the bearings; means for excluding dust and other foreign matter from the bearings; and improved means for conducting the current from the trolley pole to the leads of the motors.

Heretofore, difficulty has been experienced in connection with cars having comparatively low roofs, such as safety cars, in providing a trolley base that would permit of a proper range of movement by the pole, between the roof of the car and the trolley wire, without either employing poles of such length that they overhang the end of the car or by building a platform or other superstructure on the roof of the car and mounting the base thereon in order to permit a comparatively short pole to reach the trolley wire.

To overcome these objectionable features, we have designed the apparatus shown in the accompanying drawing herein.

Figure 1 is a view, in side elevation, of a trolley car in which our invention is embodied;

Fig. 2 is a plan view of the trolley pole and the base, showing the pole in retracted position;

Fig. 3 is a side elevational view, partially in section, of the device of Fig. 2;

Figs. 4 and 5 are detail views of the mechanism for locking the trolley pole in its lower position;

Fig. 6 is a detail view, in longitudinal section, of a portion of the pole and its socket;

Fig. 7 is a view looking in the direction of the arrows VII—VII of Fig. 6, and

Fig. 8 is a view similar to that of Fig. 3, but illustrating a modified form of connector for conducting the current from a rotatable portion of the base to a stationary portion thereof.

In Fig. 1, we have shown a trolley car 9, upon which a pair of bases 10 are mounted and each base serves to support a pole 11 that co-operates with a trolley wire 12 in the usual manner. Retaining hooks 13 are provided for maintaining the poles in retracted positions when they are not in use, one pole being employed when the car is traveling in one direction and the other pole being employed when it is traveling in the opposite direction, as is common with cars that are provided with two poles.

Referring now more particularly to Figs. 2 and 3, the base consists of a bottom portion 14, that is secured to the roof of the car by means of bolts 15. The member 14 is provided with a grooved portion 16 in which a series of steel balls 17 are adapted to roll, the groove being disposed circumferentially of the member 14 which is annular in form.

The base member 14 is provided with lugs 18 that serve as connecting members for a cover plate 19 that is also of annular form and grooved on its under side. Screw threaded studs 20 serve as attaching members to maintain the cover member 19 in position on the base member 14, nuts 21 being employed in order to maintain the cover member 19 and the base member 14 in properly spaced relations.

A swivel member 22 of annular form, provided with grooved upper and lower surfaces that co-operate with ball bearings 17 and 23, respectively, is interposed between the cover member 19 and the base member 14. The swivel member 22 is rotatable with respect to the members 14 and 19 and supports the trolley pole and tensioning means, in a manner which will now be described.

A yoke member 24, that has tongue-and-groove engagement with the swivel member 22, extends substantially one-half the circumference thereof and is provided with holes through its ends that aline with holes in a lug 25 on the swivel member. The yoke is secured to the swivel member by means of bolts 26 that pass through the lugs just referred to.

Stop members 14a and 22a are provided on the base member 14 and the swivel member 22, respectively, in order to prevent complete rotation by the swivel member.

The yoke 24 is provided with an extended portion 27 through which pivot pin 28 extends for the purpose of supporting a pole-socket member 29. The yoke member 24 is provided also with a pair of lugs 30 through which pivot pins 31 extend, for the purpose of supporting a pair of rods 32 to which tension springs 33 are connected. The cover member 19 is provided with an opening 35 through which lubricant may be poured. It will be noted that the swivel member 22 is so formed that the overflow of lubricant will flow down into the bearing therebeneath; and that the channel 16 of the bearing member 14 retains the lubricant and prevents it from flowing over the car roof. Furthermore, it will be observed that the members 14 and 22 have upstanding portions at their respective peripheries which overlap adjacent members and thereby exclude dust from the bearings and also retain lubricant therein.

The pole socket 29 is provided with a cutout portion 36 intermediate its ends, and, adjacent to its outer end, it is has a longitudinal recess 37 into which a pole 38 extends.

The pole 38 is grooved, as indicated in Fig. 7, the grooves co-operating with lugs 39 on the inner surface of the pole socket 29 in order to insure that the trolley wheel 40 will have proper alinement with the trolley wire 12. The pole socket 29 is split adjacent to its outer end and is provided with clamping members 41 to draw the split portions toward one another, thereby securely clamping trolley pole 38 in place.

A nut 42 is nonrotatably supported within the opening 37, in position to be engaged by one end of an adjusting screw 43, the other end of the adjusting screw having threaded engagement with a crosshead 44 that extends through the opening 36 of the pole socket 29. The crosshead 44 has a sliding engagement with the pole socket 29 and is maintained in place therein by means of pins 45. The crosshead 44 is grooved adjacent to its outer ends and supports one end of each of the springs 33 in the manner shown. The adjusting screw 43 is provided with right-hand threads at one end and left-hand threads at its other end and is employed for the purpose of adjusting the tension of the springs 33.

The pole socket 29 is provided with a plate member 47 that is secured thereto by rivets 48. The plate 47 is provided with a pair of recesses 49 to which conductors 50 are connected. The other ends of the conductors 50 are attached to the plate 51 that is secured to the car roof, independently of the base 14, and is provided with a portion 52 to which a motor lead (not shown) may be connected.

From the foregoing, it will be seen that current may be conducted from the trolley wheel to the motor without passing through any of the bearing members, thus providing a more efficient transmission of the current and avoiding pitting of the ball bearings.

The pole socket 29 is provided also with a pair of ears 55 riveted thereto, as shown more clearly in Figs. 4 and 5. The base portion 14 is provided with an ear 56. The members 55 and 56 are perforated for the reception of a pin 57 and serve as retaining members for the trolley pole, when the trolley pole is locked in retracted position. By locking the pole socket down, the base may be more conveniently removed from the car or the pole from the pole socket.

It will be observed that the means for attaching the base to the car roof are located between the periphery and the center thereof, leaving the car roof surrounding the base clear of obstructions, and that the trolley pole and the tensioning springs lie across the top of the base.

Furthermore, the location of the pivotal supports for the pole and springs at the front of the base permits of the base being placed on the car roof at a point which will bring the said pivotal supports approximately above the center of the roof, thus permitting the mounting of two bases on a single roof in such a manner as to avoid interference with one another and, at the same time, permitting the employment of a pole that does not extend over the roof of the car but which still has a relatively large range of movement in a vertical plane.

The adjusting screw 43 is employed to place the springs under proper tension and, at a given adjustment, the tension exerted on the trolley pole will be substantially the same at all positions.

Thus, when the pole is in the retracted position shown in the drawings, it will be seen that the arrangement of the pivotal points is such that the spring is then under its greatest tension, but the angle of the line of force with respect to the pivot pin 28 is comparatively small. As the pole is permitted to advance under the action of the springs, the tensional force of the springs decreases, but the angular direction of force with respect to the pivot 28 increases proportionately, so that when the trolley wheel has reached the trolley wire the effective tension on the pole is substantially the same as when the pole was in its retracted position. Therefore, it is clear that, as the trolley wheel rises and falls by reason of variation in the distance between the trolley wire and the roof of the car, the tension on the wheel will be substantially constant, thus eliminating the tendency to create arcs.

Should the trolley wheel accidentally become disengaged from the trolley wire, it will, of course, advance still farther, in a vertical plane, until the cross-head 44 is substantially in alinement with the pivots 28 and 31. If the movement continues, the springs will be again elongated, and thus serve as buffers, to restrain further movement of the trolley pole.

In the form of device shown in Fig. 8, the shunt members 50 and 51 are dispensed with and shunt member 60 is provided. At its outer end, the flexible shunt 60 is connected to a brush member 61 that is yieldingly held in engagement with the swivel member 22 by means of a spring 62. Connection is established between the yoke member 24 and the pole socket 29 by a flexible shunt member 65. In this case, current is conducted through the pole socket 29, shunt 65, yoke 24, and the shunt member 60, to a terminal 63 to which a motor lead may be attached. In this form of construction, no stop members are provided, thus permitting a complete rotation by the swivel member as distinguished from the partial rotation that is permitted by construction of Figs. 2 and 3.

If desired, the yoke member 24 may be dispensed with and the extensions 27 and 30 for supporting the spring members and the pole socket, respectively, may be unitary with the swivel member 22.

Various other modifications may be made in the invention without departing from the scope thereof, as defined in the accompanying claims.

We claim as our invention:

1. In combination, a trolley base, a rotatable member supported thereby, a trolley pole member, a pole actuating member disposed alongside the said pole member, means on the rotatable member for supporting the trolley pole member, means on the rotatable member for supporting the actuating member, said two means occupying different horizontal planes and the said trolley pole member being provided at its outer end with a socket for the reception of a trolley pole, a supporting member for the outer end of the said actuating member, and an adjustable connection between said actuating member and the pole supporting member, whereby the tension exerted upon the trolley pole may be varied.

2. In combination, a trolley base, a rotatable member supported thereby, a trolley pole member, a pair of pole-actuating members, means on the rotatable member for supporting the trolley pole member, and means on the rotatable member for supporting the actuating members, said two means occupying different horizontal planes, the said trolley pole member being provided, at its outer end, with a socket for the reception of a trolley pole, and the actuating members being disposed along opposite sides of the pole member.

3. In a trolley-pole-supporting structure, the combination of a rotatable member, a pole, a pole-actuating member disposed alongside the pole, means on the rotatable member for supporting the pole, and means on the rotatable member for supporting the pole-actuating member, both of said means extending beyond the periphery of the rotatable member adjacent to a point farthest removed from the free end of the pole.

4. In a trolley-pole-supporting structure, the combination of a rotatable member, a pole, a pair of pole-actuating members, means on the rotatable member for supporting said last named members, and means on the rotatable member, adjacent to the first named means, for supporting the pole, the said supporting means and the parts carried thereby, being so disposed that the pole and the actuating members extend rearwardly across the top of the rotatable member in side-by-side relation.

5. In combination, a trolley base, a rotatable member supported thereby, a trolley pole, a pair of pole-actuating members and means located adjacent to the periphery of the rotatable member for supporting the pole and the pole-actuating members, said supporting means, the pole, and the actuating members being so disposed as to normally lie across the top of the rotatable member, in side-by-side relation.

6. In combination, in a trolley-pole-supporting structure, a base member, a rotatable pole-supporting member carried thereby, a cover member lying above the rotatable member, anti-friction bearings between the upper and lower faces of the rotatable member and the cover and base members, respectively, means for confining lubricating fluid within the upper bearing, and means whereby overflow of such lubricant is directed into the bearing at the under side of the rotatable member.

7. A trolley-pole structure comprising, in combination, a pole member, a pivotal support for the pole member, an actuating member, a pivotal support for one end of the actuating member, and means for securing the other end of the actuating member to the pole member, the pivotal support for the actuating member lying in a plane above the first named support and in substantially vertical alinement therewith, whereby the torque exerted by the actuating member decreases as the movement of force of the wire pressure and the leverage of the pole member decrease.

8. In a trolley-pole structure, the combination of a pole member, a pair of actuating members disposed in substantially side-by-side relation with the pole member, a pivotal support for each of said members, a cross-head for supporting the outer ends of the actuating members, and means carried by the pole member, at a point removed from its pivot support, for adjusting the position of the crosshead to vary the force of the actuating members.

9. In a trolley-pole structure, the combination of a pole member, a pair of actuating members disposed in substantially side-by-side relation with the pole member, a pivotal support for each of said members, a crosshead for supporting the outer ends of the actuating members, and means carried by the pole member at a point removed from its pivot support for adjusting the position of the crosshead to vary the force of the actuating members, said crosshead being slidably supported by the pole member independently of the said adjusting means.

10. A trolley-pole structure comprising, in combination, a pole member, a pivotal support for the pole member, a helical spring adapted to normally exert tension on the pole, one end of the spring being fixedly secured to a member located above the said pivotal support and the other end thereof being fixedly secured to the pole member adjacent its outer end, said spring serving as a buffing member when the angle between the spring and the pole exceeds a predetermined amount.

11. A trolley-pole structure comprising, in combination, a pole member, a pivotal support for the pole member, a helical spring adapted to normally exert tension on the pole, one end of the spring being fixedly secured to a member located above the said pivotal support and the other end thereof being fixedly secured to the pole member adjacent its outer end, said spring serving as a buffing member when the angle between the spring and the pole exceeds a predetermined amount and to exert tension in a reverse direction when the pole has advanced past a predetermined point.

In testimony whereof, we have hereunto subscribed our names this 28th day of April, 1921.

LELAND F. BURNHAM.
FRANK C. FELIX.